(12) United States Patent
Morris

(10) Patent No.: US 8,677,281 B2
(45) Date of Patent: Mar. 18, 2014

(54) SYSTEM, APPARATUS AND METHOD FOR EMOTIONAL EXPERIENCE TIME SAMPLING VIA A MOBILE GRAPHICAL USER INTERFACE

(75) Inventor: Margaret Morris, Portland, OR (US)

(73) Assignee: Intel-GE Care Innovations LLC, Roseville, CA (US)

(*) Notice: Subject to any disclaimer, the term of this patent is extended or adjusted under 35 U.S.C. 154(b) by 1878 days.

(21) Appl. No.: 11/704,703

(22) Filed: Feb. 9, 2007

(65) Prior Publication Data
US 2008/0195980 A1  Aug. 14, 2008

(51) Int. Cl.
*G06F 3/14* (2006.01)
(52) U.S. Cl.
USPC .......................... 715/863; 715/772; 715/864
(58) Field of Classification Search
USPC ........................................ 715/864, 772, 863
See application file for complete search history.

(56) References Cited

U.S. PATENT DOCUMENTS

| | | | |
|---|---|---|---|
| 6,850,252 B1* | 2/2005 | Hoffberg | 715/716 |
| 2002/0005865 A1* | 1/2002 | Hayes-Roth | 345/706 |
| 2002/0152200 A1* | 10/2002 | Krichilsky et al. | 707/3 |
| 2006/0277474 A1* | 12/2006 | Robarts et al. | 715/745 |

OTHER PUBLICATIONS

C.N. Scanaill et al., "A Review of Approaches to Mobility Telemonitoring of the Elderly in Their Living Environment", Annals of Biomedical Engineering, vol. 34, No. 4, Apr. 2006.

* cited by examiner

*Primary Examiner* — Andrea Leggett
(74) *Attorney, Agent, or Firm* — Pillsbury Winthrop Shaw Pittman LLP

(57) ABSTRACT

A system, apparatus and method for experience time sampling via a mobile graphical user interface. A method includes receiving mood data from an individual in predefined time intervals via a mood mapping graphical user interface hosted by a mobile device. The mood mapping graphical user interface is comprised of a 2×2 diagram having a valence dimension and an intensity dimension. Other embodiments are described and claimed.

14 Claims, 4 Drawing Sheets

SYSTEM, APPARATUS AND METHOD FOR EMOTIONAL EXPERIENCE TIME SAMPLING VIA A MOBILE GRAPHICAL USER INTERFACE

CROSS-REFERENCE TO RELATED APPLICATIONS

This application is related to pending U.S. patent application Ser. No. 11/641,973, filed on Dec. 20, 2006, and entitled "Apparatus for Monitoring Physiological, Activity and Environmental Data," by inventors Margaret Morris, Terry Dishongh and Farzin Guilak.

BACKGROUND

The Positive and Negative Affect Scale ("PANAS") questionnaire is a self-report mood scale that measures current mood. The PANAS questionnaire is a 20-item questionnaire designed to measure positive and negative affect with little overlap. The questionnaire consists of 10 words relating to positive affectivity and 10 words relating to negative affectivity. Individuals are instructed to rate each item on a 5-point scale reflecting the extent to which they experienced the emotion during the past 24 hours (i.e., likert scale). The likert scale for each item ranges from 0 (very slightly or not at all) to 4 (extremely). The two key dimensions of affect that were used to develop the PANAS questionnaire items are valence and intensity.

The self-monitoring of health states is critical for health improvement on the individual level and for meaningful health research. But, unfortunately, there are some significant barriers to self-monitoring of health states via questionnaires, such as the PANAS questionnaire. Such questionnaires can be time consuming and counterintuitive (e.g., rating emotions on a likert scale).

DETAILED DESCRIPTION

Various embodiments may be generally directed to a graphical user interface that allows for emotional experience time sampling or "mood mapping" via a device. In an embodiment of the invention, a mood mapping graphical user interface is implemented on a mobile device that allows an individual to track emotional states in a manner that is more immediate and intuitive than filling out a questionnaire, such as the PANAS questionnaire. User input is guided by the logical use of dimensions (e.g., intensity and valence) via the mood mapping graphical user interface.

Mood data entered by the individual may be cross validated via other data inputted into the device hosting the mood mapping graphical user interface, such as data collected via physiological stress, contextual and/or self-monitoring sensors or indicator(s) associated with the individual. If appropriate, one or more mobile therapies may be administered on the mobile device to improve the emotional regulation of the individual. A mobile therapy is a therapy administered via a mobile device that provides therapeutic feedback to the individual on a real-time basis either right before, during or directly after a stressful situation.

In an embodiment, the mood mapping user interface is implemented as a single touch screen experience via a graphical touch screen input device. An additional benefit of the invention is that the form factor for the mood mapping user interface is non-stigmatizing.

In other embodiments, the present invention may be used for "user experience assessment." Here, the invention may be used for assessing user satisfaction with consumer products or devices by allowing the user to enter feelings about the products during their use (e.g., pleased, annoyed, impatient, anxious, proud, etc.). Here, user satisfaction may be inferred from their mood during usage. Questions to users may be adapted to reflect their feelings about the product or device. Other embodiments may be described and claimed.

Various embodiments may comprise one or more elements or components. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
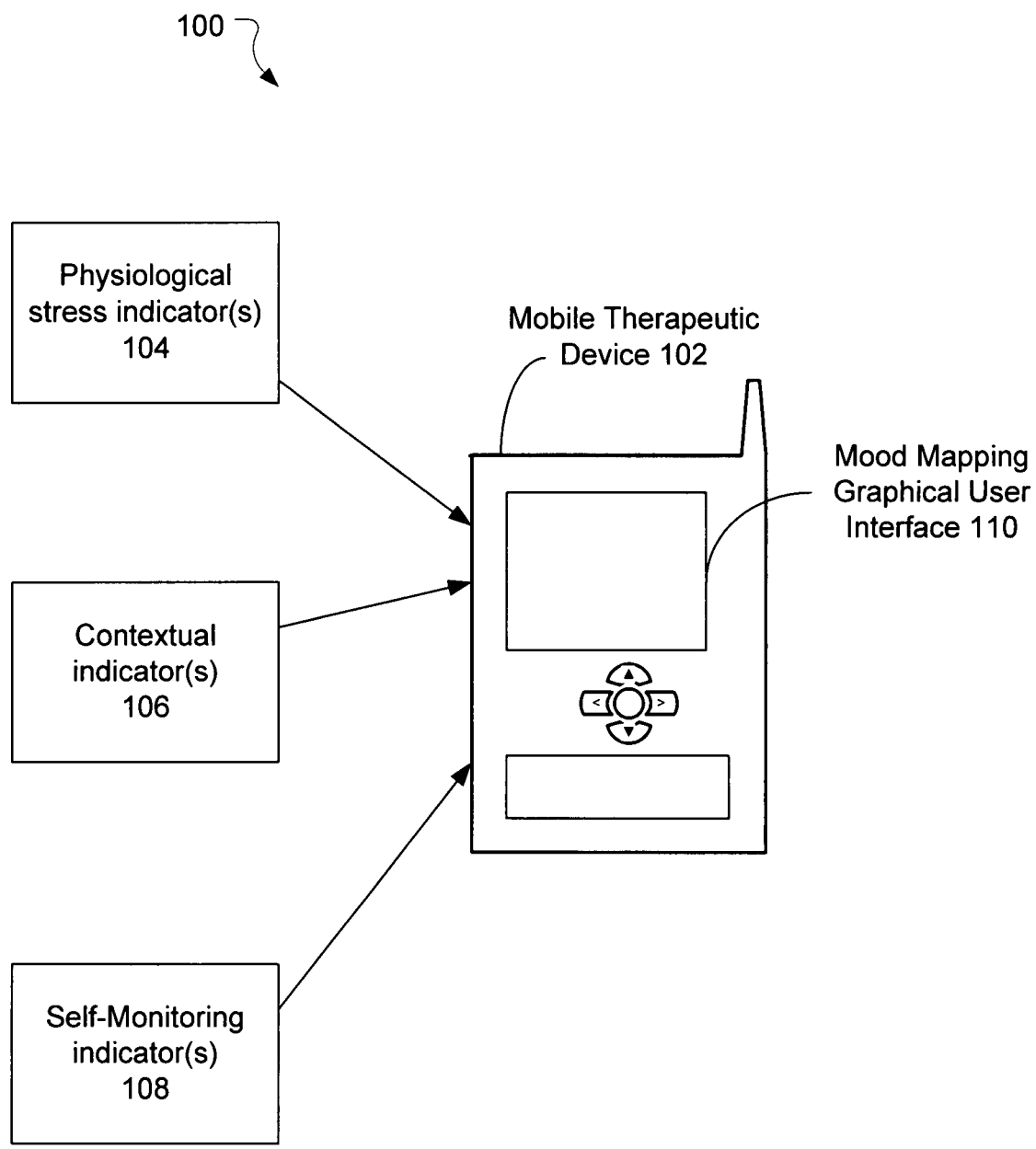
FIG. 1 illustrates one embodiment of a system for experience time sampling of emotion or "mood mapping" via a mobile device.

FIG. 1 illustrates one embodiment of a system 100 for experience time sampling of emotion or "mood mapping" via a mobile device. Referring to FIG. 1, system 100 may comprise a mobile therapeutic device 102, one or more physiological stress indicator(s) 104, one or more contextual indicator(s) 106, one or more self-monitoring indicator(s) 108 and a mood mapping graphical user interface 110. At a high level and in an embodiment, mood mapping graphical user interface 110 is incorporated into mobile therapeutic device 102 and allows an individual to enter mood mapping data. The data entered by the individual may be similar to data provided via a likert scale questionnaire, such as the PANAS questionnaire. The individual is asked to indicate his or her mood via mood mapping graphical user interface 110 in predefined time intervals. In an embodiment, the entered responses are collected from the individual every thirty (30) minutes in an experience time sampling approach that allows for trending of emotional states. The frequent collection of mood data is important for research and clinical purposes because people are generally terrible at retrospective recall (e.g., they can't remember how they felt and not good at seeing correlations with other factors). People tend to remember their most recent emotional state and generalize (e.g., if happy at the moment of questioning, then they report that they are generally happy, etc.).

Variability in emotional states (as reported by mood mapping graphical user interface 110) can be mapped over time and correlated with physiological, behavior and contextual factors. In an embodiment, mood mapping graphical user interface 110 is implemented as a single touch screen input.

Mood mapping graphical user interface 110 will be described below in more detail with reference to FIG. 3.

Mood data entered by the individual via mood mapping graphical user interface 110 may be cross validated via other data inputted into device 102 that corresponds to the individual. Such data may be collected via one or more of physiological stress sensors or indicator(s) 104, contextual indicator(s) 106 and/or self-monitoring indicator(s) 108. The collected data are wirelessly transmitted to mobile therapeutic device 102. Device 102 processes the data to cross validate negative mood data entered by the individual.

If appropriate, mobile therapeutic device 102 determines an appropriate mobile therapy to improve the emotional regulation of the individual. A mobile therapy is a therapy administered via a mobile device. The administered mobile therapy via device 102 provides therapeutic feedback to the individual on a real-time basis either during or directly after the negative mood. At a high level, mobile therapies include, but are not limited to, interventions such as biofeedback, breathing exercises, progressive muscle relation exercises, timely presentation of personal media (e.g., music and images collected from users), offering of an exit strategy (e.g., a phone call that helps the user escape from a stressful situation), references to a range of psychotherapeutic techniques, and graphical representations of trends (e.g., depictions of health metrics over time). Each of the components or elements of system 100 will be discussed next in more detail.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared data may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

As discussed above, real-time data may be continuously collected for an individual via physiological stress indicator(s) 104, contextual indicator(s) 106 and/or self-monitoring indicator(s) 108. The collected data may be wirelessly transmitted to mobile therapeutic device 102 via, for example, Bluetooth technology, Zigbee technology or a proprietary system. The invention is not limited to these example wireless technologies. Alternatively, indicator(s) 104, 106 and/or 108 may transmit data to device 102 via a wired connection, or some combination of wireless and wired connection technologies.

Indicator(s) 104, 106 and/or 108 may also be adapted to store real-time data via integrated long term storage, such as flash memory for example, and then transmit the data to mobile therapeutic device 102 at a later time. The integrated long term storage helps to ensure that no collected data are lost if there is no connection currently available with device 102.

An additional benefit of the invention is that the form factors for the entering of mood data, the monitoring of data and the administration of the mobile therapies are non-stigmatizing. Thus, the invention may especially appeal to individuals who are concerned about health and wellness, but do not want to announce his or her concerns publicly.

In an embodiment of the invention, physiological stress indicator(s) 104 is comprised of a small form factor of integrated physiological and activity monitoring of an individual. Physiological stress indicator(s) 104 is worn by the individual. This may include a small form factor that combines wireless ECG to measure heart rate; an oximeter unit to measure oxygenation level; a multiaxial accelerometer to measure activity level; and a temperature sensor to measure temperature level.

The integrated physiological monitoring may also include one or more of a unit to measure galvanic skin response; a pulse wave velocity monitor to monitor blood pressure; a pulse oximeter unit to measure SPO2; a minimally invasive or noninvasive glucometry monitor unit to measure blood sugar; a unit to measure spirometry; a unit to measure respiration rate; a unit to measure speech characteristics (including volume, characteristics of speech associated with stress, speech cadence, latency, pause length, phonetic distinctness, word transposition, speech prosody, and indications of affect and variability in these speech characteristics); a unit to measure typing speed and errors; a unit to measure muscle tension; and so forth. These examples are not meant to limit the invention. In fact, the invention contemplates the use of any means to monitor an individual.

The integrated physiological monitoring is able to identify emotional stress with higher accuracy than is possible with any individual sensor. An increase in heart rate that is not preceded by activity (as measured by the accelerometer) is likely to be caused by increased stress. Similarly, an increase in skin temperature following activity may be a normal physiological response, but without activity may indicate illness or stress.

In an embodiment of the invention, physiological stress indicator(s) 104 is an integrated physiological monitor worn by an individual as a wireless chest worn sensor. The sensor may communicate with mobile therapeutic device 102 via a Body Area Network (BAN)—a short-range wireless network to transmit monitored data.

In an embodiment of the invention, contextual indicator(s) 106 may include location sensors in the individual's environment to indicate arrival at places associated with negative moods (e.g., stress). For example, location sensors may be placed in the individual's car, workplace, home, worn on the individual, incorporated into mobile therapeutic device 102, and so forth. Location information may also be obtained via Global Positioning System (GPS) technology.

Contextual indicator(s) 106 may also include a calendar sync with mobile therapeutic device 102 to indicate upcoming social interactions associated with stress and/or negative moods (e.g., first time meeting future in-laws, job interview appointments, etc.) and/or times during the day associated with stress and/or negative moods (e.g., daily drive to and from work during rush hour, etc.).

In embodiments of the invention, self-monitoring indicator(s) 108 may include various ways in which an individual may provide data or feedback to mobile therapeutic device 102 via direct or indirect input into device 102. This may include, but is not necessarily limited to, a panic button, journaling and behavioral patterns to elicit interventions from device 102.

For example, journaling allows the individual to provide a vocal self report of health related behaviors and states to mobile therapeutic device 102 via either a phone call, microphone, or via some other vocal input means associated with device 102. The capture of voice notes via journaling allows for analysis of health indicator(s) within the speech itself. For example, speech volume, clarity, precision and slippages may be indicator(s) of depression, cognitive decline or other health concerns.

The individual via device 102 may enter data associated with his or her behavior. For example, the individual may indicate a negative mood and then enter information that he or she just ate three donuts.

As discussed above, mobile therapeutic device 102 receives real-time (or stored) data via physiological stress indicator(s) 104, contextual indicator(s) 106 and/or self-monitoring indicator(s) 108. Device 102 processes the data to validate a negative mood entered by the individual via mood mapping graphical user interface 110. If a negative mood is validated, mobile therapeutic device 102 determines an appropriate mobile therapy. The administered mobile therapy via device 102 helps to improve the emotional regulation or mood of the individual.

In other embodiments, the present invention may be used for assessing user satisfaction with products by allowing the user to enter feelings about the products during their use (e.g., pleased, annoyed, impatient, anxious, proud, etc.). Here, user satisfaction may be inferred from their mood during usage. Questions to users may be adapted to reflect their feelings about the product or device.

In one embodiment, mobile therapeutic device 102 may be any mobile device capable of performing the functionality of the invention described herein. Device 102 may be implemented as part of a wired communication system, a wireless communication system, or a combination of both. In one embodiment, for example, device 102 may be implemented as a mobile computing device having wireless capabilities. A mobile computing device may refer to any device having a processing system and a mobile power source or supply, such as one or more batteries, for example.

Examples of embodiments of a mobile computing device that may be adapted to include the functionality of the present invention include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth.

Examples of such a mobile computing device also may include computers that are arranged to be worn by a person, such as a wrist computer, finger computer, ring computer, eyeglass computer, belt-clip computer, arm-band computer, shoe computers, clothing computers, and other wearable computers.

Figure 2:
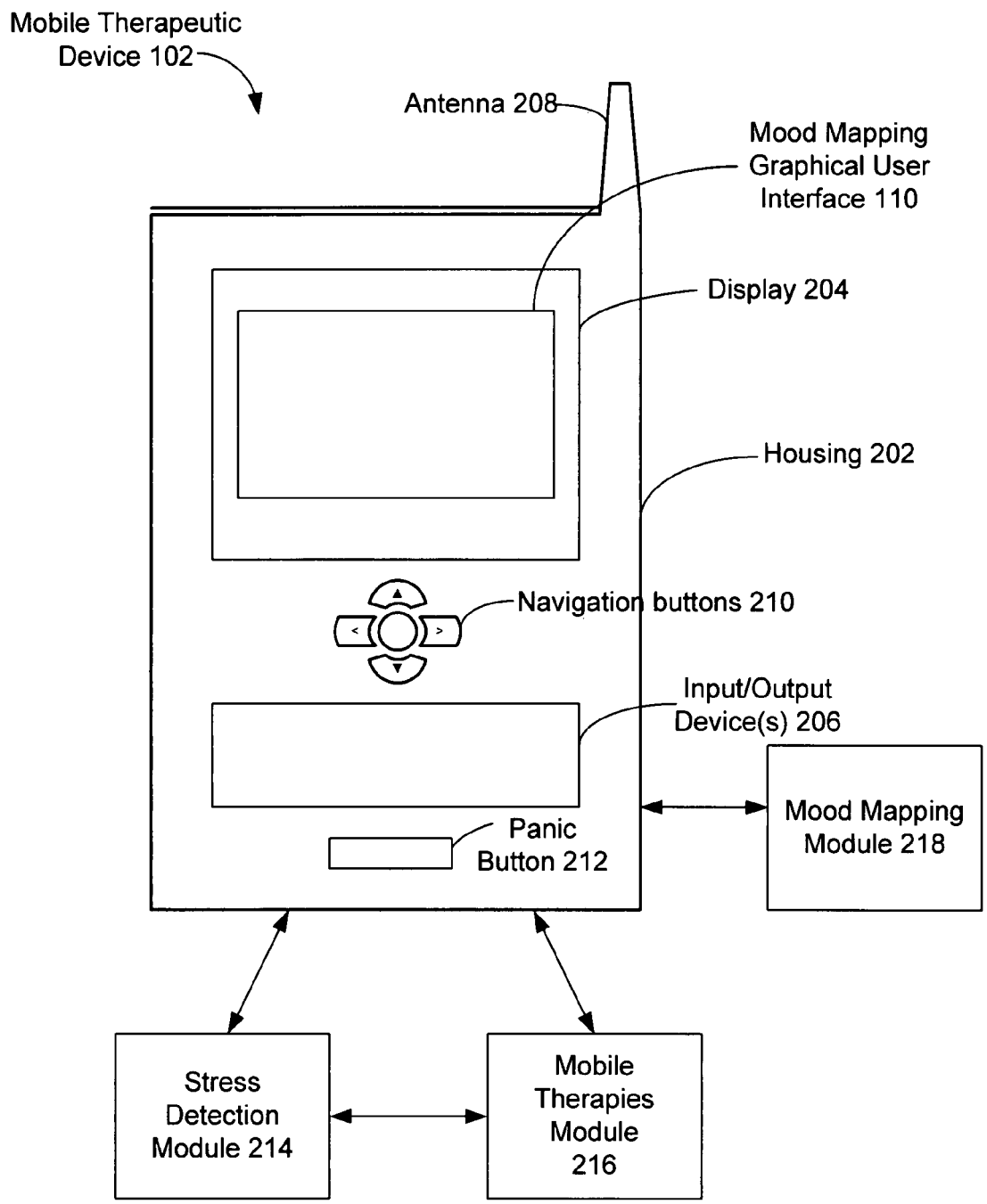
FIG. 2 illustrates one embodiment of an apparatus for experience time sampling or mood mapping via a mobile device.

A more detailed description of an embodiment of mobile therapeutic device 102 is shown in FIG. 2. Referring to FIG. 2, device 102 may include a housing 202, a display 204, one or more input/output devices 206, an antenna 208, navigation buttons 210, a panic button 212, a stress detection module 214, a mobile therapies module 216 and a mood mapping module 218. Mood mapping graphical user interface 110 is displayed on display 204. Each of these components is described next in more detail.

Housing 202 may comprise any suitable housing, but typically involves a small form factor to enable mobile therapeutic device 102 to be easily transportable.

Display 204 may comprise any suitable display unit for displaying information appropriate for a mobile computing device. Display 204 is used by the invention to display mobile therapies to the individual, to assist with input into device 102 via mood mapping graphical user interface 110, and so forth.

I/O device(s) 206 may comprise any suitable I/O device for entering information into and receiving information from mobile computing device 102. In embodiments of the invention, input is gathered implicitly from physiological monitoring and via touching iconic images on a screen to indicate ratings, for example. Input may also be gathered by gestures (e.g., turning mobile therapeutic device 102 upside down to indicate state of mind, etc.).

Examples for I/O device(s) 206 may include a suitable alphanumeric keyboard, a numeric keypad, a touch pad, input keys, buttons, switches, rocker switches, a microphone, a speaker, voice recognition device and software, and so forth. Information may be entered into device 102 by way of microphone. Such information may be digitized by a voice recognition device. The embodiments are not limited in this context.

Antenna 208 is used to facilitate wireless communication with mobile therapeutic device 102.

In one embodiment, navigation buttons 210 comprise an upward navigation button, a downward navigation button, a leftward navigation button, and a rightward navigation button. Navigation buttons 210 also may comprise a select button to execute a particular function on mobile therapeutic device 102.

Panic button 212 may be used by an individual to elicit immediate intervention with mobile therapeutic device 102.

As described above, stress detection module 214 processes the data sent from physiological stress indicator(s) 104, contextual indicator(s) 106 and/or self-monitoring indicator(s) 108 to cross validate a negative mood by the individual. If so, mobile therapies module 216 determines an appropriate mobile therapy. The administered mobile therapy via device 102 provides therapeutic feedback to the individual on a real-time basis during or directly after the indication of the negative mood. At a high level, mobile therapies include, but are not limited to, interventions such as biofeedback, breathing exercises, progressive muscle relation exercises, timely presentation of personal media (e.g., music and images collected from users), offering of an exit strategy (e.g., a phone call that helps the user escape from a stressful situation), references to a range of psychotherapeutic techniques, and graphical representations of trends (e.g., depictions of health metrics over time).

Mobile therapies may be defined and stored in mobile therapeutic device 102. Example mobile therapies may include, but are not limited to, exit strategy therapy, picture therapy, breathing exercise therapy, music therapy, emergency therapy, hourglass animation therapy, phone biofeedback therapy, cognitive reframing therapy, progressive muscle relaxation therapy, visual trend analysis therapy, and so forth. These example mobile therapies are provided for illustration purposes only and are not meant to limit the invention.

Mood mapping module 218 is used to collect the entered responses via mood mapping graphical user interface 110. In an embodiment, the individual indicates his or her mood every predefined time interval (e.g., thirty (30) minutes) in an experience time sampling approach that allows for trending of emotional states. Mood mapping module 218 may be used to map the variability in emotional states of the individual over time and correlate this variability in emotional states with physiological, behavior and contextual factors.

Figure 3:
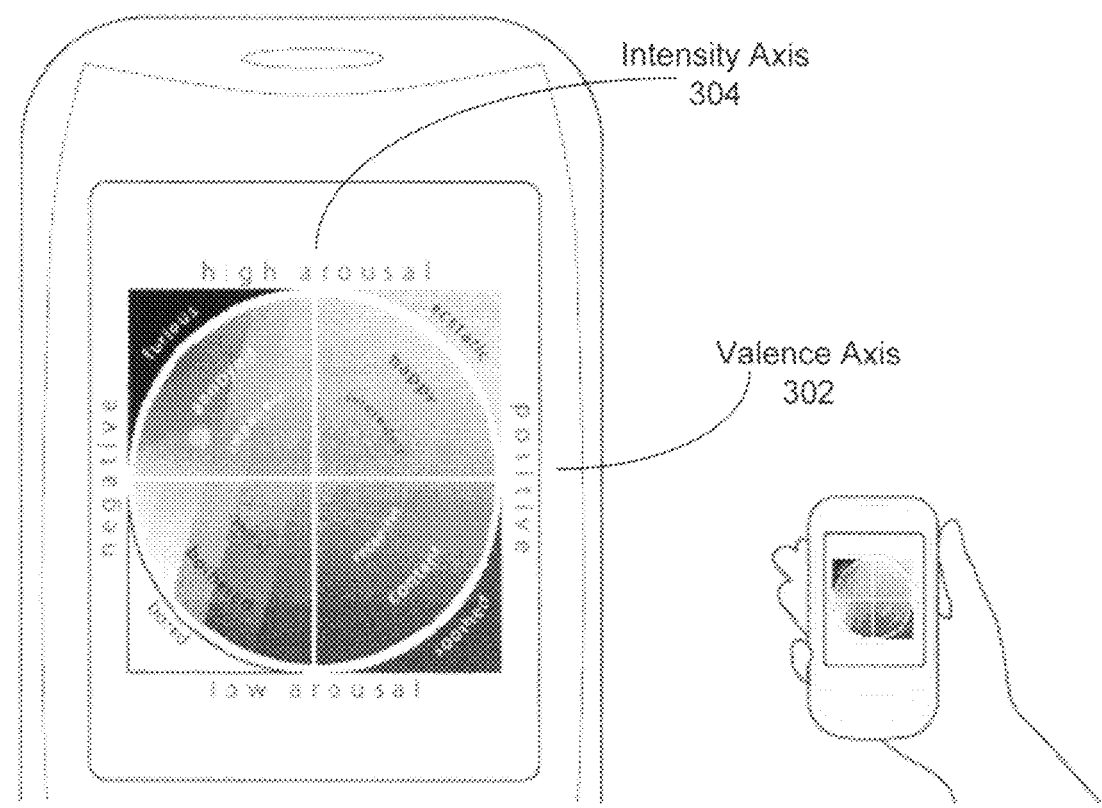
FIG. 3 illustrates one embodiment of a graphical user interface for experience time sampling or mood mapping via a mobile device.

FIG. 3 illustrates one embodiment of a graphical user interface for experience time sampling or mood mapping via a mobile device. Referring to FIG. 3, mood mapping graphical user interface 110 is implemented via a touch screen graphical user interface displaying a two dimensional (2×2) interactive diagram of two key mood dimensions (intensity and valence). As mentioned above, intensity and valence have been demonstrated to consistently and universally capture essential factors of emotional experience. Valence is represented by a valence axis 302 (i.e., X axis) of the graphical user interface and intensity is represented by an intensity axis 304 (i.e., Y axis) of the graphical user interface.

Valence axis 302 and intensity axis 304 divide mood mapping graphical user interface 110 into four quadrants. The individual is further guided by semantic labels in each of these quadrants and a color gradient. The semantic labels and color gradients illustrated in FIG. 3 are provided for illustrations purposes only and are not meant to limit the invention. In other embodiments of the invention, while the dimensions of intensity and valence would remain constant, the semantic or verbal labels and/or color gradients may be changed within each quadrant according to the topic of the study, computing platform and/or application being tested.

The present invention advances psychometrics by reducing the recoding of emotional experience required in most questionnaires. Most questionnaires, including the PANAS questionnaire, require the individual to attach a numerical or adjective label from a likert scale to their emotion. The proposed method of the present invention of touching a point on mood mapping graphical user interface 110 is more intuitive than attaching one of these labels to emotions.

In an embodiment of the invention, an individual enters a mood selection via touching mood mapping graphical user interface 110. Other embodiments of the invention may include tracking not only touch on user interface 110, but also the duration and pressure of the finger press as well as physiological responses such as galvanic skin response.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof.

Figure 4:
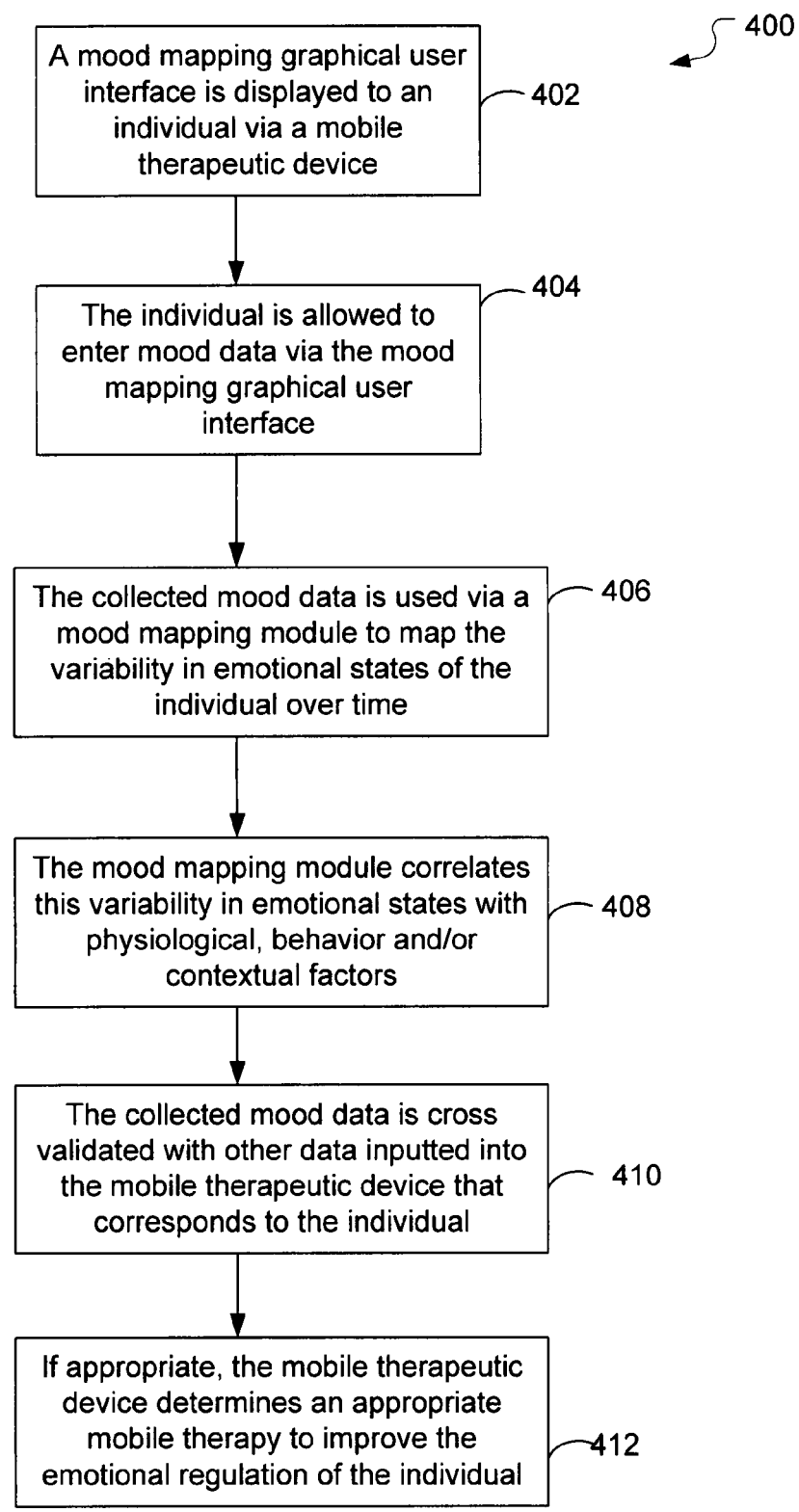
FIG. 4 illustrates one embodiment of a logic flow for experience time sampling or mood mapping via a mobile device.

FIG. 4 illustrates one embodiment of a logic flow 400. The logic flow 400 may be representative of the operations executed by one or more embodiments described herein, for example, the operations executed by system 100.

Referring to FIG. 4, at block 402, mood mapping graphical user interface 110 is displayed to an individual via mobile therapeutic device 102.

At block 404, the individual is allowed to enter mood data via mood mapping graphical user interface 110. As described above and in an embodiment of the invention, the individual indicates his or her mood every predefined time interval (e.g., thirty (30) minutes) in an experience time sampling approach that allows for trending of emotional states. The mood data may be collected and stored in mood mapping module 218.

At block 406, the collected mood data is used via mood mapping module 218 to map the variability in emotional states of the individual over time.

At block 408, mood mapping module 218 correlates this variability in emotional states with physiological, behavior and/or contextual factors.

At block 410, the collected mood data is cross validated with other data inputted into mobile therapeutic device 102 that corresponds to the individual. Such data, to help cross-validate the current mood of the individual, may be collected via one or more of physiological stress indicator(s) 104, contextual indicator(s) 106 and/or self-monitoring indicator(s) 108.

At block 412, if appropriate, mobile therapeutic device 102 determines an appropriate mobile therapy to improve the emotional regulation of the individual. The administered mobile therapy via device 102 provides therapeutic feedback to the individual on a real-time basis either during or directly after the negative mood.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
   a mobile device; and
   a mood mapping graphical user interface hosted via the mobile device to receive mood data from an individual in predefined time intervals, wherein the mood mapping graphical user interface is comprised of a touch screen having a 2×2 diagram with a valence dimension and an intensity dimension, and the mood data is to correspond to the individual from whom the mood data is received.

2. The system of claim 1, wherein the 2×2 diagram further comprises one or more semantic labels.

3. The system of claim 2, wherein the 2×2 diagram further comprises a color gradient.

4. The system of claim 1, wherein the mood mapping graphical user interface is used to assess user satisfaction with a consumer device.

5. The system of claim 1, wherein the mobile device is to identify a trend of emotional states based on mood data received in multiple predefined time intervals.

6. The system of claim 1, further including an indicator input, the mobile device to use data from the indicator input to validate a negative mood indicated by the mood data.

7. A method, comprising:
   receiving mood data from an individual in predefined time intervals via a mood mapping graphical user interface hosted by a mobile device, wherein the mood mapping graphical user interface is comprised of a touch screen having 2×2 diagram with a valence dimension and an intensity dimension, and the mood data corresponds to the individual from whom the mood data is received.

8. The method of claim 7, wherein the 2×2 diagram further comprises one or more semantic labels.

9. The method of claim 8, wherein the 2×2 diagram further comprises a color gradient.

10. The method of claim 7, wherein the mood mapping graphical user interface is used to assess user satisfaction with a consumer device.

11. A machine-readable medium containing instructions which, when executed by a processing system, cause the processing system to perform a method, the method comprising:
    receiving mood data from an individual in predefined time intervals via a mood mapping graphical user interface hosted by a mobile device, wherein the mood mapping graphical user interface is comprised of a touch screen having a 2×2 diagram with a valence dimension and an intensity dimension, and the mood data is to correspond to the individual from whom the mood data is received.

12. The machine-readable medium of claim 11, wherein the 2×2 diagram further comprises one or more semantic labels.

13. The machine-readable medium of claim 12, wherein the 2×2 diagram further comprises a color gradient.

14. The machine-readable medium of claim 11, wherein the mood mapping graphical user interface is used to assess user satisfaction with a consumer device.

* * * * *